(12) United States Patent
Klaffert et al.

(10) Patent No.: US 9,946,061 B2
(45) Date of Patent: Apr. 17, 2018

(54) ROBUST SUPPORT STRUCTURE FOR AN OPTICAL REFLECTING TELESCOPE

(71) Applicant: MBDA Deutschland GmbH, Schrobenhausen (DE)

(72) Inventors: Thomas Klaffert, Freising (DE); Michael Schneider, Gachenbach (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 319 days.

(21) Appl. No.: 14/680,136

(22) Filed: Apr. 7, 2015

(65) Prior Publication Data
US 2016/0011410 A1 Jan. 14, 2016

(30) Foreign Application Priority Data
Apr. 19, 2014 (DE) .................. 10 2014 005 839

(51) Int. Cl.
| | | |
|---|---|---|
| *G02B 23/00* | (2006.01) | |
| *G02B 23/16* | (2006.01) | |
| *G02B 7/18* | (2006.01) | |
| *G02B 7/183* | (2006.01) | |
| *G02B 7/182* | (2006.01) | |
| *G02B 23/06* | (2006.01) | |
| *G02B 17/06* | (2006.01) | |

(52) U.S. Cl.
CPC ............ *G02B 23/16* (2013.01); *G02B 7/181* (2013.01); *G02B 7/182* (2013.01); *G02B 7/183* (2013.01); *G02B 23/06* (2013.01); *G02B 17/0621* (2013.01)

(58) Field of Classification Search
CPC ........ G02B 23/06; G02B 7/181; G02B 7/183; G02B 17/0605; G02B 17/0621; G02B 17/0642; G02B 17/0657; G02B 23/02; G02B 23/14; G02B 23/16; G02B 7/182; G02B 7/1822; G02B 7/00; G02B 21/00; G02B 23/00

See application file for complete search history.

(56) References Cited

U.S. PATENT DOCUMENTS

| | | | |
|---|---|---|---|
| 4,265,510 | A | 5/1981 | Cook |
| 5,058,993 | A | 10/1991 | Wakugawa |
| 5,734,516 | A | 3/1998 | Sayede |
| 5,760,979 | A | 6/1998 | Saito |
| 6,455,830 | B1 * | 9/2002 | Whalen ............... G01C 11/025 250/203.1 |

(Continued)

FOREIGN PATENT DOCUMENTS

| | | |
|---|---|---|
| GB | 1188578 A | 4/1970 |
| WO | WO9800743 A1 | 1/1998 |

*Primary Examiner* — Bumsuk Won
*Assistant Examiner* — Balram Parbadia
(74) *Attorney, Agent, or Firm* — Von Rohrscheldt Patents (57) ABSTRACT

A support structure for an optical reflecting telescope including a beam inlet a primary support for a primary mirror, a secondary support for a secondary mirror, struts which extend between the primary support and the secondary support, and a beam outlet. The support structure has a contour of a single shell hyperboloid. The primary support, the secondary support and the struts are configured so that they support the primary mirror and the secondary mirror so that a z-shaped beam path is provided between the beam inlet, the primary mirror, the secondary mirror and the beam outlet. The struts have identical length.

7 Claims, 4 Drawing Sheets

(56) References Cited

U.S. PATENT DOCUMENTS

| | | | |
|---|---|---|---|
| 6,519,084 B1 * | 2/2003 | Kawasaki | B64G 1/66 359/225.1 |
| 6,555,803 B1 * | 4/2003 | Bremer | G01C 11/02 250/203.1 |
| 2003/0179443 A1 | 9/2003 | Cook | |
| 2005/0183377 A1 | 8/2005 | Johnson | |
| 2011/0310502 A1 | 12/2011 | Blanchard et al. | |

* cited by examiner

ROBUST SUPPORT STRUCTURE FOR AN OPTICAL REFLECTING TELESCOPE

RELATED APPLICATIONS

This application claims priority from and incorporates by reference German Patent Application DE 10 2014 005 839.5 filed on Apr. 19, 2014.

FIELD OF THE INVENTION

The invention relates to a support structure for an optical reflecting telescope and an optical reflecting telescope with the support structure. The optical reflecting telescope is in particular a highly dynamically orientable off-axis telescope.

BACKGROUND OF THE INVENTION

Optical reflecting telescopes are telescopes which essentially use reflective optical elements (mirrors). An optical reflecting telescope is essentially made of a main mirror and a capture mirror that is mounted in the same tube. These mirrors are also designated as primary and secondary mirrors. Contrary to a lens arrangement of a spy glass, incident light is not refracted but reflected by the primary mirror. The tube or support structure is typically configured as a tubular or lattice structure wherein the primary mirror is arranged at one end and the secondary mirror is arranged at another end.

US 2011/0310502 (A1) discloses an optical space surveillance system including a primary mirror, a secondary mirror a support base and an optical measuring device.

U.S. Pat. No. 5,058,993 discloses an optical bench with a pair of end plates which are fixated at each other by a number of tubular connecting elements.

Optical reflecting telescopes can be implemented as a matter of principle either as "on-axis-optics" or "off-axis-optics". It is an essential difference whether optical axes of the mirror surfaces coincide with their geometric axes (on-axis) or not (off-axis).

In both cases the primary and the secondary mirrors have to be positioned very precisely relative to each other so that on the one hand side their optical axes that are arranged either centric or outside of the mirror surfaces are oriented precisely coaxial in an ideal case and on the other hand side so that the set focal distance remains invariant under ail external conditions. In case of off-axis mirrors the roll angle to be adjusted has to be kept robust with respect to a longitudinal direction of the optical reflecting telescope over a long time period.

Deviations from a coaxial alignment would cause imaging errors or degrade spot quality and spot radius. Changes of the focal length would cause a change of the focusing plane. Furthermore large reflecting telescope pivot angles are very challenging for the mass and stiffness properties of the support structure in the gravity field of the earth in combination with high tracking accelerations wherein the support structure also has to comply with substantial thermal requirements. Off-axis-optics make it even more difficult to implement a thermally and mechanically robust structure due to an asymmetrical arrangement of optical elements and due to the additional degree of freedom that has to be controlled.

BRIEF SUMMARY OF THE INVENTION

Thus, it is an object of the present invention to provide an improved support structure and an improved reflecting telescope wherein the support structure implements a high level of thermal and mechanical robustness.

The object is achieved by a support structure for an optical reflecting telescope, including a beam inlet, a primary support for a primary mirror, a secondary support for a secondary mirror, struts which extend between the primary support and the secondary support, and a beam outlet. The support structure has a contour of a single shell hyperboloid. The primary support, the secondary support and the struts are configured so that they support the primary mirror and the secondary mirror so that a Z-shaped beam path is provided between the beam inlet, the primary mirror, the secondary mirror and the beam outlet, and the struts have identical length, The object is also achieved by an optical reflecting telescope including a primary mirror, a secondary mirror, and a support structure including a beam inlet, a primary support for a primary mirror, a secondary support for a secondary mirror, struts which extend between the primary support and the secondary support, and a beam outlet. The support structure has a contour of a single shell hyperboloid. The primary support, the secondary support and the struts are configured so that they support the primary mirror and the secondary mirror so that a z-shaped beam path is provided between the beam inlet, the primary mirror the secondary mirror and the beam outlet, and the struts have an identical length.

Advantageous embodiments and variations can be derived from the dependent claims and the subsequent description.

It is being proposed to provide a support structure for an optical reflecting telescope. The support structure includes a beam inlet, a primary support for a primary mirror, a secondary support for a secondary mirror, struts which extend between the primary support and the secondary support and a beam outlet. The support structure has a contour of a single shell hyperboloid. The support structure can also have a contour of a multi shell hyperboloid. In the simplest case the single shell hyperboloid is a surface which is created by a straight line rotating about the axis of the hyperboloid. The hyperboloid can have a closed structure or an open or segmented structure. According to the parameters of the single shell hyperboloid all sections along a tangential straight line have exactly have the same length. In case the support structure is not cut to size otherwise at its ends all its struts essentially have identical length and can be segments or fibers of any material, advantageously, however of a composite material. Essentially the same length means deviations of the lengths of various struts of less than 20%, advantageously less than 10% or advantageously less than 5%.

The primary support, the secondary support and the struts can be configured so that they support the primary mirror and the secondary mirror in a way so that at least the optical axis of one of the mirrors deviates from its geometric axis. Advantageously this is the primary mirror. The primary support, the secondary support and the struts can also be configured so that they support the primary mirror and the secondary mirror so that both optical axes of the two mirrors deviate from their respective geometric axes.

The primary support, the secondary support and the struts are furthermore configured so that they support the primary mirror and the secondary mirror in a manner so that a Z-shaped beam path between the beam inlet, the primary mirror, the secondary mirror, and the beam outlet is implemented. Beam inlet and beam outlet are locations where the beams, e.g. light beams enter the support structure or exit the support structure. The beam inlet and the beam outlet are interchangeable at will.

This way a support structure and a reflecting telescope are provided which is characterized by a high level of thermal and mechanical stability or robustness and which also facilitates highly dynamic tracking movements of the telescope in the gravity field of the earth through a suitable structural configuration without significantly degrading the optical quality of the telescope. Thus, for example, highly dynamic target acquisition, tracking and engagement are also facilitated with off-axis optical telescopes which has numerous operational advantages.

Put differently, when all struts (any number) have equal length independently from a geometrical off-axis mirror arrangement symmetrical properties with respect to the connection points of the struts are achievable with identical length expansion coefficients, identical elasticity modules and identical struts cross sections of the struts. The thermal or mechanical expansion of identical struts with respect to elasticity modulus and cross section (e.g. by their own weight in the gravitational field of the earth or through high centrifugal forces at high pivot rates) thus only causes a focus change of the telescope along a Z-shaped beam path in that an alignment of the telescope mirrors relative to one another is mechanically and thermally invariant in the remaining five degrees of freedom, This way a support structure for an optical off-axis mirror telescope is provided with a thermally and mechanically maximized passive robustness.

The present invention furthermore facilitates uncomplicated computation and thus control of the support structure of the telescope from a structure mechanical point of view since no cambered or elbowed struts or fibers are required. Thus a risk of bulging or distortion is reduced to a minimum which is a requirement for high optical quality under large temperature variations and under high transversal accelerations.

Based on the single axis linear expansion coefficients, simple thermal control is provided since only the thermal length expansion coefficient of the structural material is relevant in one direction, this means in longitudinal direction of the strut or along the fiber, Furthermore a thermal length expansion of identical struts only causes a focal change of the telescope along the angle of the z-shaped beam path. In all other directions the structure is thermally invariant which provides error minimizing properties.

The number of struts can be set at will. Advantageously at least 3 or 4 struts are used. The struts can respectively extend coaxial to tangents of the hyperboloid.

The support structure can furthermore include at least one deflection support for a deflection mirror. The deflection support is advantageously arranged so that the beam path at the beam inlet and at the beam outlet is run along a tangent of the hyperboloid. The beam incoming direction and the beam outgoing direction is then provided without shadowing along the tangent of the hyperboloid support structure an that no cut through the structural wall in the area of the pivot axis is required for a pivotably supported telescope and optimum error neutralization is provided for mechanical and thermal length expansion. Thus, the pivot axis can always be placed at an optimum position from a structural mechanical point of view which is also an essential prerequisite for minimizing optical errors even under the highest level of directional dynamics.

Figure 3A:
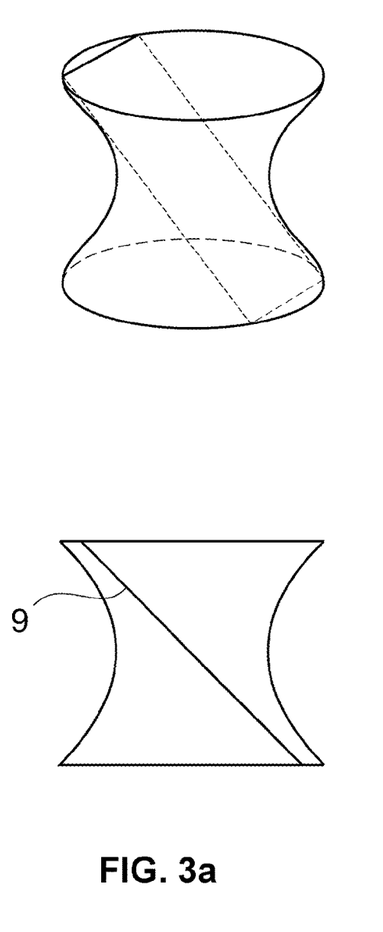
FIGS. 3a, b illustrate two sectional planes which are defined by two straight lines wherein each of the straight lines generates the single shell hyperboloid through rotation.
Figure 3B:
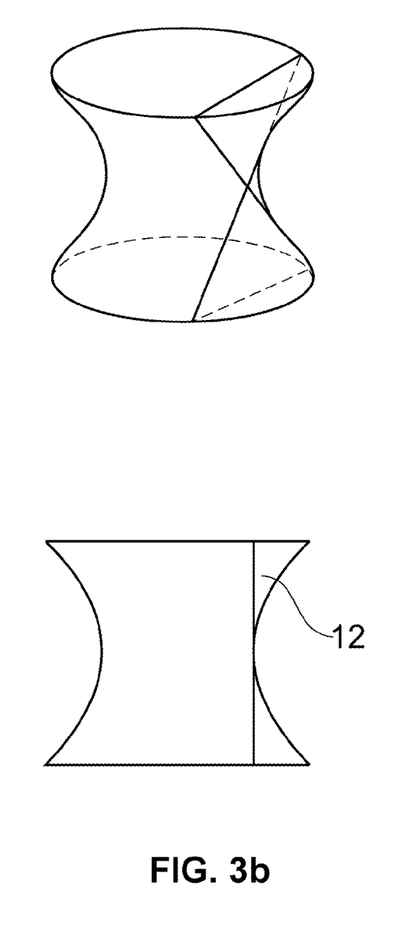

The support structure can furthermore include at least one fine orienting support for a fine orienting mirror. The fine orienting support is advantageously arranged so that an optical axis of the fine orienting mirror is essentially on a first sectional plane 12 (c.f. FIG. 3b) of the hyperboloid or parallel thereto, wherein the first sectional plane is defined by two intersecting straight lines wherein each of the straight lines generates the single shell hyperboloid through rotation.

The fine orienting support is furthermore advantageously arranged so that the fine orienting mirror can be arranged parallel to the incoming beam direction and the outgoing beam direction and so that the fine orienting mirror has to be arranged parallel to the first sectional plane of the hyperboloid described supra. Parallel to this first sectional plane an optimum position can be found which neutralizes optical errors based on structural deformations under acceleration forces in the best way possible. This way a tangential beam incoming direction is provided which neutralizes optical errors based on structural deformations caused by acceleration forces in an optimum manner, It is furthermore proposed to provide an optical reflecting telescope. The optical reflecting telescope includes a primary mirror, a secondary mirror and the support structure. The support structure in turn includes a beam inlet, a primary support for the primary mirror, a secondary support for the secondary mirror, struts that extend between the primary support and the secondary support and a beam outlet.

The primary support, the secondary support and the struts can be configured so that they carry the primary mirror and the secondary mirror in a manner so that at least the optical axis of one of the mirrors differs from its geometrical axis. The primary support, the secondary support and the struts are configured to support the primary mirror and the secondary mirror in a manner so that a Z-shaped beam path is provided between the beam inlet, the primary mirror, the secondary mirror and the beam outlet.

The support structure has a contour of a single shell hyperboloid. The struts essentially have identical length.

As a result the reflecting telescope is provided with error minimizing properties from a structure mechanical point of view. Thus, it is feasible, for example, in spite of the asymmetrical arrangement of the mirror masses not to generate torsion torques within the support structure for a Cardan suspension along the main inertial axis of the telescope for pivot accelerations in azimuth and elevation.

The simple and advantageously straight strut geometry furthermore facilitates using standard profiles. Analogously a closed structure is advantageously producible from fiber reinforced composite materials with straight tangentially preloaded fibers with identical length which simultaneously provides the option to produce sandwich structures or combinations of these embodiments.

Advantageously the end points of the struts or the connecting points of the hyperboloid support structure are arranged essentially symmetrical to the geometric axes of the primary mirror and the secondary mirror including their supports. This way essentially orthotropic properties and at least non anisotropic properties can be implemented from a structural and mechanical point of view.

Advantageously the support structure is configured so that a section of the Z-shaped beam path extends essentially parallel to a second sectional plane of the hyperboloid. The second sectional plane 9 (cf. FIG. 3a) is defined by two parallel straight lines, wherein each of the two parallel straight lines generates the single shell hyperboloid through rotation. This way the telescope is provided with thermal error minimizing properties.

Advantageously the support structure is configured so that the second sectional plane of the hyperboloid essentially extends on a main axis of inertia of the reflecting telescope which provides structure mechanically error minimizing properties to the reflecting telescope. Advantageously also a geometric connecting line of the primary mirror and the secondary mirror essentially extends on the main axis of inertia of the mirror telescope. Thus, it is facilitated in spite of an asymmetrical arrangement of the mirror masses that no torsion torques are generated within the support structure in case of a Cardan suspension along the main axis of inertia of the telescope for a simultaneous pivot acceleration in azimuth and elevation, For additional transversal stiffening of the telescope and also for providing interfaces for connecting the telescope and optical and mechatronic systems and components additional strut and connection elements with different length and arrangement can be added from a structure mechanical point of view as long as their connection points are selected so that the basic principle of thermal and mechanical robustness described supra is not compromised.

Additionally a pivotable suspension of the telescope with an incoming or outgoing Coudé beam path is feasible without having to interrupt the support structure for an input into the mirror or an output from the mirror. This facilitates optimum positioning of the pivot axis under a structure mechanical point of view and a thermal and mechanical symmetry of the support structure is implementable with respect to the telescope pivot axis.

This furthermore provides the option for a zero tension connection of the hyperboloid support structure at an optimum position within any outer enveloping structure for protection against environmental impacts wherein the optimum fixed connection between both structures is provided from a thermal point of view in a plane which is orthogonal to the axis of the telescope and coincides with the telescope pivot axis.

Additionally there is an option for installing a device for focal point adjustment essentially along the second sectional plane of the hyperboloid. The option for connecting a device for mirror fine adjustment analogous to classic on-axis telescopes is provided unchanged.

BRIEF DESCRIPTION OF THE DRAWINGS

Further features, advantages and applications of the instant invention can be derived from the subsequent description of the embodiments and the figures. Thus, all described and/or depicted features by themselves and in any combination constitute the subject matter of the invention independently from the individual claims and their dependencies. In the figures identical reference numerals designate identical or similar objects.

Subsequently embodiments of the invention are described in more detail with reference to the appended drawing figure, wherein.

DETAILED DESCRIPTION OF THE INVENTION

Optical reflecting telescopes can be implemented in principle either as "on-axis-optics" or "off-axis-optics". For on axis optics like, for example, Newton. Cassegrain or Nasmynth telescopes, the optical axes of the optical components are arranged coaxial to their geometric axes and thus also the axis of the telescope arrangement. However, a disadvantage of "on-axis reflecting telescopes" is the shaded portion on the main mirror caused by the centrally supported capture mirror itself. For example, in the Cassegrain telescope this portion configured as a cut out in the center of the main mirror can be used for image introduction, however, the required telescope diameter with reference to the achievable optical aperture is increased by this exact amount. In particular in transmitter telescopes this condition is additionally degraded in that the shading would occur exactly in the portion of maximum intensity of the exiting light bundle.

So called off-axis-optics offer an alternative approach with this respect. In case the cut out surfaces of the off-axis components are completely adjacent to the optical axis (with reference to the mathematical source function of the surface), the off-axis components can be asymmetrically arranged so that mutual shading of the optical components amongst each other is prevented by flat or three dimensional Z-shaped beam paths.

In reflecting telescopes this has the advantage that the secondary mirror including its support and optional, additional devices and supply devices for adjusting and focal point adjusting do not have to be arranged in the portion of the outlet aperture or inlet aperture of the telescope anymore. Contrary to on-axis-optics, thus the entire primary mirror surface becomes useable without shading also without preinstalled optical additional devices which in particular for high performance transmission telescopes has substantial disadvantages with respect to avoiding scatter light The tradeoff is that this increases the demands upon the telescope structure in two respects. First of all the off-axis telescope optics have to be adjusted in all six degrees of freedom and subsequently have to be supported in a thermally and mechanically robust manner. For on-axis-optics there are only five degrees of freedom since their components have invariant behavior with respect to a rotation about their optical axis. However, there are no error neutralizing or error halfing properties anymore due to the geometrical asymmetric arrangement of the optical components with respect to the telescope axis (where geometrical and optical axes are far apart) which is different from the on-axis-optics.

Figure 1:
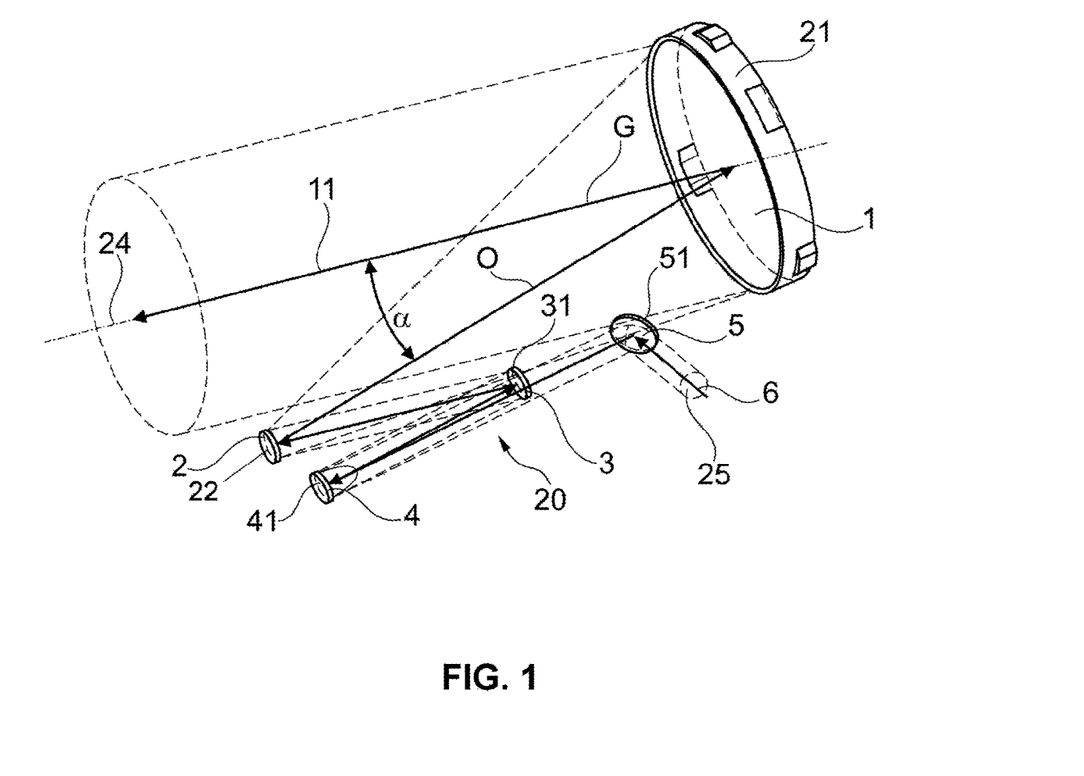
FIG. 1 illustrates a schematic representation of a mirror arrangement and abeam path through an optical off-axis reflecting telescope.

FIG. 1 illustrates a schematic representation of a mirror arrangement and a beam path through an optical off-axis mirror telescope. The mirror telescope 30 is illustrated in FIGS. 2 and 4. It includes a primary mirror 1, a secondary mirror 2 and a support structure 20. The support structure 20 includes a beam inlet or outlet 24, a primary support 21 for the primary mirror 1, a secondary support 22 for the secondary mirror 2, struts 23 which extend between the primary support 21 and the secondary support 22, a beam outlet 24 or beam inlet 25, and a mirror beam outlet or a mirror beam inlet 6. The beam inlet 24 and the beam outlet 25 can be switched at will so that transmission or receiving telescopes can be provided.

The primary support 21, the secondary support 22 and the struts 23 support the primary mirror 1 and the secondary mirror 2 so that the beam direction between the mirrors 1, 2 deviates from the telescope axis and the beam outlet direction or the beam inlet direction. The primary support 21, the secondary support 22 and the struts 23 support the primary mirror 1 and the secondary mirror 2 furthermore in a manner so that a z-shaped beam path 11 is provided between the beam inlet 24, the primary mirror 1, the secondary mirror 2 and the beam outlet 25. The arrow direction of the beam path 11 yields the viewing direction of a user or the direction of a beam that is put out. Beam inlet and beam outlet are locations where the beams, for example, the light beams enter the mirror telescope 30 or exit it again.

The support structure 20 furthermore includes two deflection mirrors 4, 5 and their deflection supports 41, 51. Also the deflection mirrors 4, 5 are in the beam path 11. The support structure 20 furthermore includes an integrated fine orientation mirror 3 and a fine orientation support 31. The fine orientation mirror 3 is also arranged in the beam path 11.

Figure 2A:
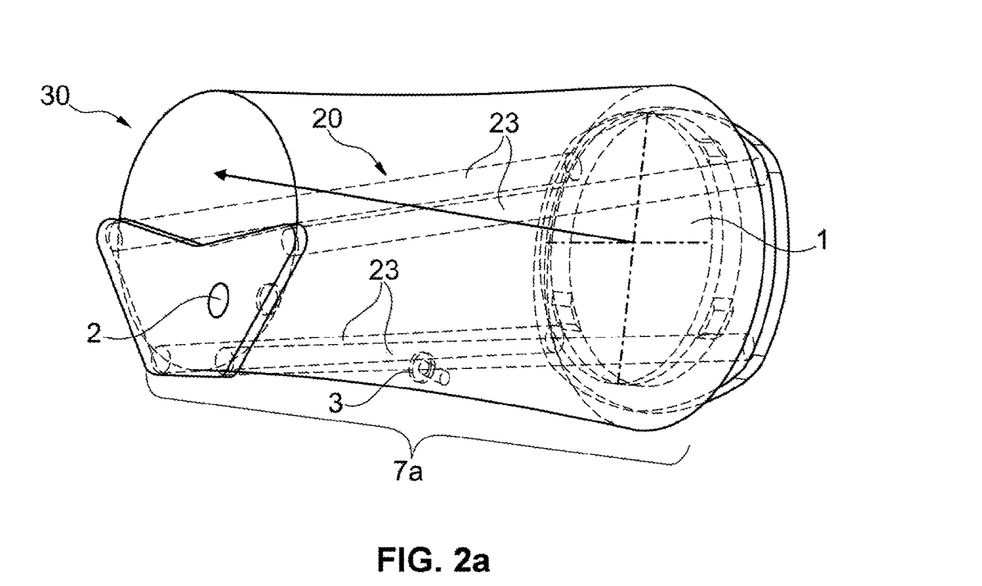
FIGS. 2a, b illustrate schematic representations of a closed hyperboloid off-axis telescope structure.
Figure 2B:
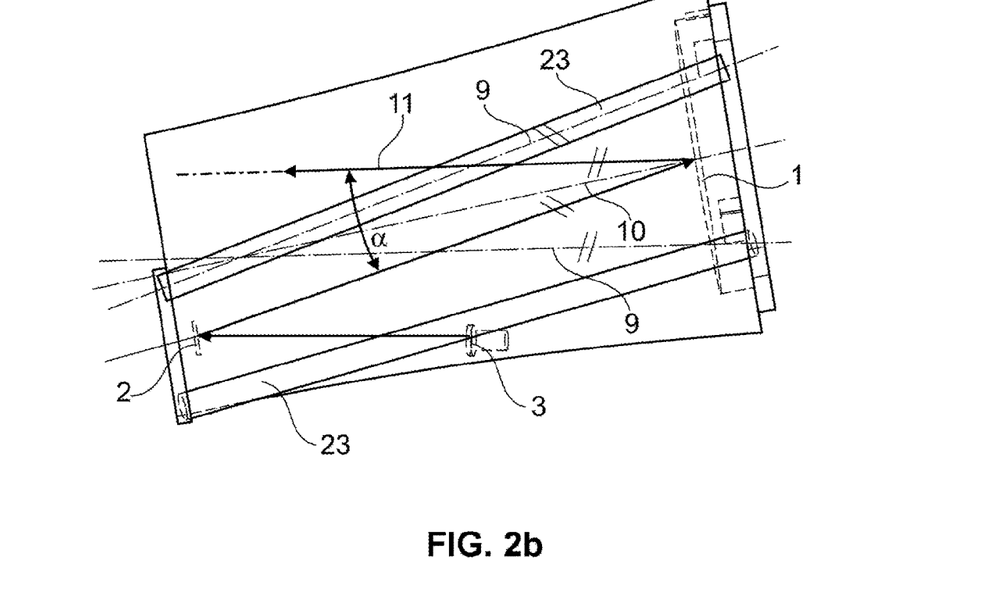

FIGS. 2a and 2b illustrate schematic representations of a closed hyperboloid off-axis telescope structure. The support structure 20 has the contour of a closed single shell hyperboloid 7a. The mirror telescope 30 includes the primary mirror 1, the secondary mirror 2, the fine orientation mirror 3 and optionally additional struts 23 of the support structure 20. The additional straight struts extend in this case along the tangents of the closed hyperboloid between the mirrors 1, 2 and essentially have identical length. The reflecting telescope 30 includes a rotation-axis 10 of the closed hyperboloid shell and a z-shaped beam path 11 (FIG. 2b). The z-shaped beam path 11 extends between the beam inlet and beam outlet of the large aperture, the primary mirror 1, the secondary mirror 2, and the fine orientation mirror 3.

Between two sections or legs of the beam path 11 there is an angle α. A section of the z-shaped beam path 11 extends essentially parallel to a second sectional plane 9 of the hyperboloid 7. As illustrated in FIG. 3a, this second sectional plane 9 is defined by two parallel straight lines wherein each of the two parallel straight lines generates the single shell hyperboloid through rotation. This way the entire telescope structure additionally gains error minimizing properties, this means identical deformations of the support structure only have minimal negative optical consequences.

Figure 4A:
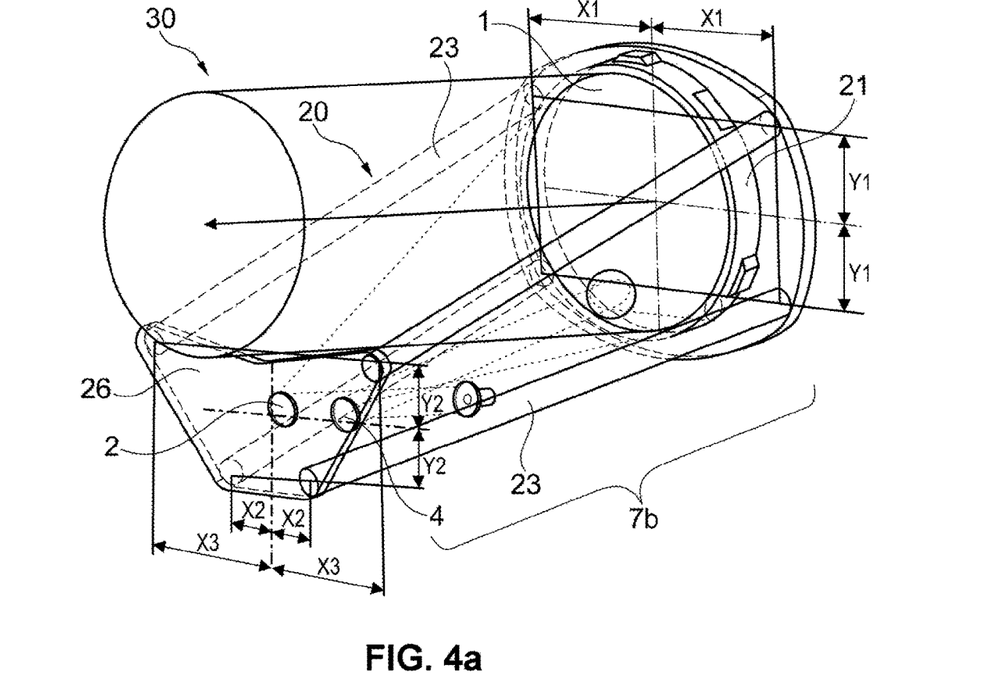
FIG. 4a, b illustrate representations of an open or segmented hyperboloid telescope structure.
Figure 4B:
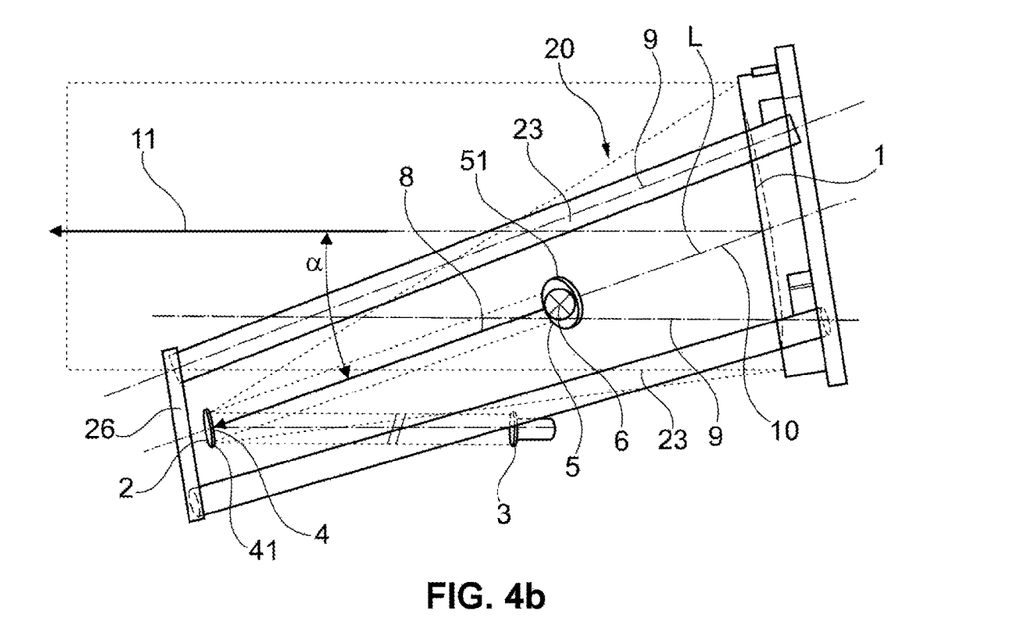

FIGS. 4a and 4b illustrate schematic representations of an open or segmented hyperboloid off-axis telescope structure. The support structure 20 in this case includes struts 23 which extend at the hyperboloid 7a in a tangential direction. The support structure 20 includes a z-shaped beam path 11 (FIG. 4b) and the primary mirror 1, the secondary mirror 2, the fine orientation mirror 3, the deflection mirrors 4, 5, the mirror beam inlet 6, and struts 23. The deflection supports 41 51 or the deflection mirrors 4, 5 are arranged so that they run the beam inlet and/or outlet along a tangent 8 of the hyperboloid. The geometric connection line L of the primary mirror 1 and the secondary mirror 2 essentially extends on a main axis of inertia 10 of the reflecting telescope 30 or parallel thereto at a small distance.

The straight struts 23 extend between the mirrors 1, 2 and essentially have identical lengths. Put differently irrespective of the geometric eccentric mirror arrangement (off-axis) all struts (any number) always have equal length and are arranged together with their supports 21, 22 symmetrical to the geometric axes of the mirrors 1 and 2 so that in combination with identical length expansion coefficients and identical elasticity modules of the struts 23 symmetrical properties with respect to a connection of the mirrors 1, 2 become achievable. A thermal or mechanical longitudinal extension of identical struts 23 caused, for example, by its mass in the gravitation field of the earth or by centrifugal forces at high rates of change of the velocity vector, thus causes solely a change of focal length between the mirrors 1, 2 along the z-shaped beam path 11 wherein the alignment of the telescope mirrors 1, 2 relative to one another is mechanically and thermally invariant in the remaining five degrees of freedom.

The struts 23 extend essentially coaxial to tangents 8 of the hyperboloid 7. End points of the struts 23 or connection points of the hyperboloid support structure 20, for example, at an end plate 26 or at the primary support 21 are essentially symmetrically arranged (X1, X2, X3, Y1, Y2) relative to the geometrical axes of the primary mirror 1 and the secondary mirror 2 including the supports 21, 22. This way structure mechanical properties can be generated that are substantially orthotropic.

The hyperboloid support structure 20 is configured so that a geometric connection line L of the primary mirror 1 and the secondary mirror 2 extends essentially on a main axis of inertia 10 of the reflecting telescope 30 or parallel thereto at very little distance. The main axis of inertia 10 is located in the second sectional plane 9. The second sectional plane 9 is defined by two parallel straight lines wherein each of the straight lines generates the single shell hyperboloid through rotation. This way it is implemented that no torsion torques are generated within the support structure 20 in spite of an asymmetrical arrangement of the mirror masses in case of a Cardan suspension along the main axis of inertia 10 of the telescope 30 for a simultaneous pivot acceleration in azimuth and elevation.

A section of the z-shaped beam path 11 extends essentially parallel to a second sectional plane 9 of the hyperboloid 7b. The deflection mirrors 4, 5 or their deflection supports 41, 51 are arranged so that they run a section of the beam path 11 along a tangent 8 of the hyperboloid 7b. The beam input and output direction between the deflection mirrors 4, 5 is provided without shading along the tangent 8 of the hyperboloid support structure 20 so that a pivotably supported telescope 30 with incoming or outgoing Coudé beam path does not require a cut out of the structural wall in the portion of the pivot axis. Thus, the pivot axis can always be placed at a position that is optimum from a structural mechanical point of view which is also an essential prerequisite for a minimization of optical errors at a highest level of orientation dynamics.

The fine orientation mirror 3 is essentially arranged on or parallel to a first sectional plane 11 of the hyperboloid structure T As illustrated in FIG. 3b the first sectional plane 11 is defined by two intersecting straight lines wherein each of the straight lines generates the single shell hyperboloid through rotation. An optimum position of the fine orientation mirror 3 can be found in this plane wherein the optimum position neutralizes optical errors due to structural deformation or transversal acceleration forces in the best way possible.

What is claimed is:
1. An optical reflecting telescope, comprising:
   a primary mirror;
   a secondary mirror; and
   a support structure including
      a beam inlet, a primary support for the primary mirror,
a secondary support for the secondary mirror,
struts which extend between the primary support and the secondary support, and
a beam outlet,
wherein an optical axis of the primary mirror or an optical axis of the secondary mirror deviates from a geometrical axis of the respective primary or secondary mirror,
wherein the support structure has a contour of a single shell hyperboloid,
wherein the primary support, the secondary support and the struts are configured so that they support the primary mirror and the secondary mirror so that a z-shaped beam path is provided between the beam inlet, the primary mirror the secondary mirror and the beam outlet,
wherein the struts have identical length, and
wherein the support structure is configured such that
a sectional plane of the single shell hyperboloid extends on a main axis of inertia of the optical reflecting telescope,
a geometric connection line of the primary mirror and the secondary mirror extends on the main axis of inertia of the optical reflecting telescope, and
a section of the z-shaped beam path extends parallel to the sectional plane of the single shell hyperboloid.

2. The optical reflecting telescope according to claim 1, wherein end points of the struts are arranged symmetrical to geometric axes of the primary mirror and the secondary mirror.

3. The optical reflecting telescope according to claim 1, wherein the single shell hyperboloid is based on a rotation of a straight line and has a closed or a segmented structure.

4. The optical reflecting telescope according to claim 1, wherein the struts respectively extend coaxial to tangents of the single shell hyperboloid.

5. The optical reflecting telescope according to claim 1, further comprising:
   at least one deflection support for a deflection mirror,
   wherein the support structure is arranged to run at least one section of the beam path along a tangent of the single shell hyperboloid.

6. The optical reflecting telescope according to claim 1, further comprising:
   a fine orientation support for a fine orientation minor,
   wherein the fine orientation support is arranged so that an optical axis of the fine orientation mirror is arranged in a first sectional plane of the single shell hyperboloid.

7. The optical reflecting telescope according to claim 1, wherein the support structure has a contour of a closed single shell hyperboloid.

* * * * *